US007630612B2

(12) United States Patent
Kent, Jr. et al.

(10) Patent No.: US 7,630,612 B2
(45) Date of Patent: Dec. 8, 2009

(54) VIDEO STREAM ADAPTIVE FRAME RATE SCHEME

(75) Inventors: Larry G. Kent, Jr., Loganville, GA (US); W. Todd Daniell, Marietta, GA (US); Joel A. Davis, Marietta, GA (US); Brian K. Daigle, Marietta, GA (US)

(73) Assignee: AT&T Intellectual Property, I, L.P., Bedminster, NJ (US)

( * ) Notice: Subject to any disclaimer, the term of this patent is extended or adjusted under 35 U.S.C. 154(b) by 921 days.

(21) Appl. No.: 10/364,562

(22) Filed: Feb. 10, 2003

(65) Prior Publication Data
US 2004/0156624 A1     Aug. 12, 2004

(51) Int. Cl.
*H04N 5/91* (2006.01)
*H04N 7/00* (2006.01)
(52) U.S. Cl. .......................... 386/46; 386/125; 386/98
(58) Field of Classification Search ................ 386/46, 386/125, 98
See application file for complete search history.

(56) References Cited
U.S. PATENT DOCUMENTS

| | | | |
|---|---|---|---|
| 5,561,466 A | | 10/1996 | Kiriyama |
| 5,822,537 A | * | 10/1998 | Katseff et al. ............... 709/231 |
| 6,625,656 B2 | * | 9/2003 | Goldhor et al. ............. 709/231 |
| 6,665,751 B1 | * | 12/2003 | Chen et al. ..................... 710/52 |
| 6,704,281 B1 | | 3/2004 | Hourunranta et al. |
| 6,754,273 B1 | | 6/2004 | Sackstein et al. |
| 6,885,987 B2 | | 4/2005 | Buchholz et al. |
| 2002/0013949 A1 | * | 1/2002 | Hejna, Jr. .................... 725/100 |

OTHER PUBLICATIONS

U.S. Appl. No. 10/364,694, filed Feb. 10, 2003, entitled "Audio Stream Adaptive Frequency Scheme," Inventors: Larry G. Kent Jr., et al.
Response dated Nov. 5, 2008 to Office Action dated Aug. 5, 2008 in U.S. Appl. No. 10/364,694.
Notice of Allowance / Allowability dated Dec. 12, 2008 in U.S. Appl. No. 10/364,694.
Supplemental Notice of Allowance / Allowability dated Apr. 3, 2009 in U.S. Appl. No. 10/364,694.
U.S. Official Action dated Aug. 5, 2008 in U.S. Appl. No. 10/364,694.

\* cited by examiner

*Primary Examiner*—Thai Tran
*Assistant Examiner*—Girumsew Wendmagegn
(74) *Attorney, Agent, or Firm*—Hope Baldauff Hartman LLC

(57) ABSTRACT

A system for a video stream adaptive frame rate comprises a video capture device for sending video samples captured from a video source and a video playback device for receiving video samples from the video capture device. The video capture device includes a playback buffer and is configured to adjust a playback of the video samples from the playback buffer when the buffer is not within a designated target range. Other systems and methods are also provided.

3 Claims, 7 Drawing Sheets

VIDEO STREAM ADAPTIVE FRAME RATE SCHEME

TECHNICAL FIELD

The present invention is generally related to communications and, more particularly, is related to video communications.

BACKGROUND OF THE INVENTION

When streaming video capture and playback video sample clocks are not synchronized, playback buffers are often slowly starved or flooded with video data. This can cause the video playback to break up.

One current approach is to wait until the playback buffer has become empty or overflowed. Once this has happened, the playback is stopped and restarted at the optimal buffer level. This results in video breaking up. The Motion Picture Experts Group (MPEG) utilizes systems that encode clocking information in the stream to synchronize capture and playback clocks. However, delays may still result in erratic playback.

Thus, a heretofore-unaddressed need exists for a solution that addresses the aforementioned deficiencies and inadequacies.

SUMMARY OF THE INVENTION

The preferred embodiments of the present invention provide systems and methods for providing a video stream adaptive frame rate system.

Briefly described, in architecture, one preferred embodiment of one system, among others, can be implemented as follows. A video stream adaptive frame rate system comprises a video capture device for sending video samples captured from a video source and a video playback device for receiving video samples from the video capture device. The video capture device includes a playback buffer and is configured to adjust a playback of the video samples from the buffer when the buffer is not within a designated target range.

The preferred embodiment of the present invention can also be viewed as providing a video stream adaptive frame rate system. In this regard, one embodiment of such a method, among others, can be broadly summarized by the following steps: receiving a video source at a playback buffer; and adjusting a buffer level of the playback buffer when the buffer level is not within a designated target range.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for providing a video stream adaptive frame rate system. To facilitate description of the inventive systems, an example system that can be used to implement the systems and methods for providing a video stream adaptive frame rate system is discussed with reference to the figures. Although this system is described in detail, it will be appreciated that this system is provided for purposes of illustration only and that various modifications are feasible without departing from the inventive concept.

For example, while several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawing specifically describes video stream adaptive frequencies, it will be clear to one of ordinary skill in the art that the systems and methods presented herein may be extended to other video streaming applications such as voice-over Internet protocol (VoIP), video conferences, etc. After the example system has been described, an example of the operation of the system will be provided to explain the manner in which the system can be used to provide a video stream adaptive frame rate system.

Figure 1:
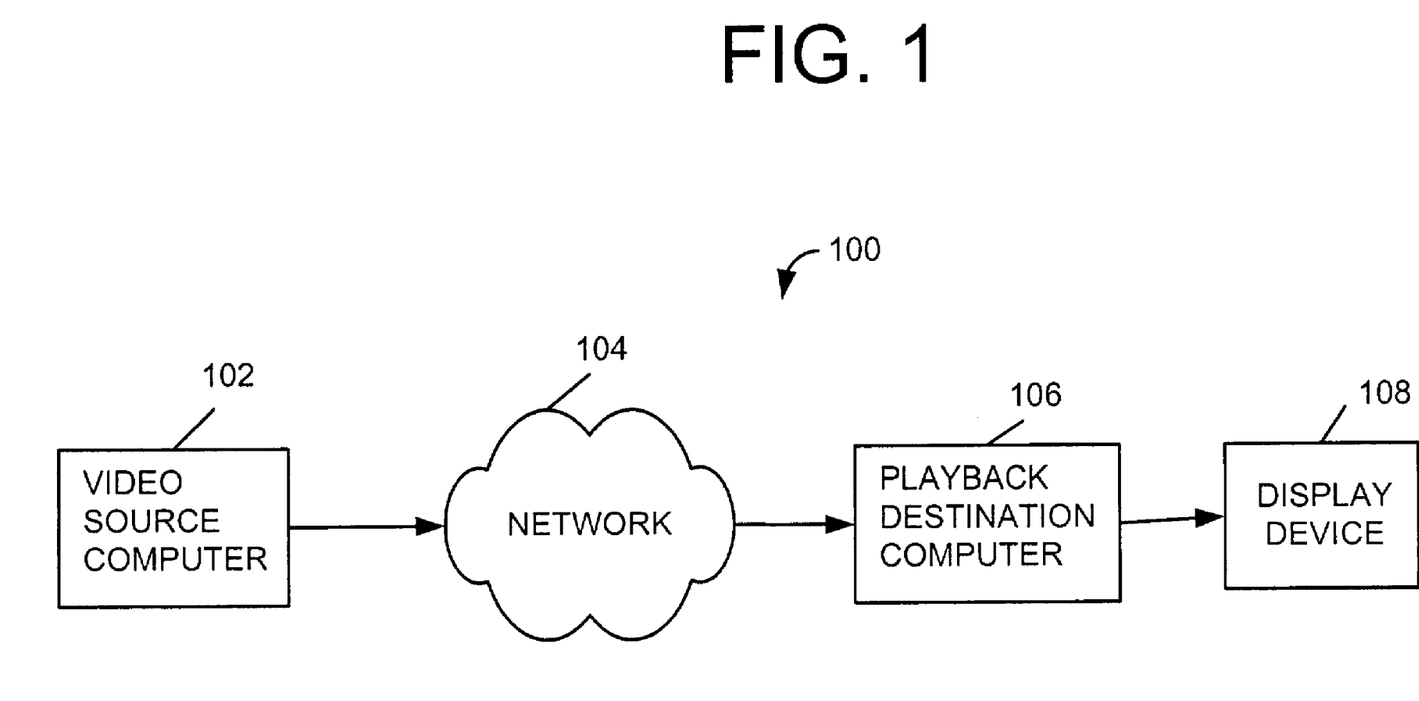
FIG. 1 is a block diagram depicting a system in which a video stream adaptive frame rate system may be implemented.

Referring now in more detail to the drawings, in which like numerals indicate corresponding parts throughout the several views, FIG. 1 is a block diagram depicting a system 100 in which a video stream adaptive frame rate system may be implemented. The system 100 includes a video source device 102, a network 104, playback destination device 106 and a display device 108. Some embodiments include speaker 108 as part of the playback destination device 106. In an example, the video source device 102 captures a video source at certain number of frames per second, for instance 5 frames per second, utilizing any known video capture methods such as sampling, encoding, compression, or MPEG, among others. The number of frames captured at the video source device 102 may not be exact and may deviate a few percentages above or below the desired frame rate per second. The video source device 102, includes a buffer (not shown) that fills as the video source is captured. In an example, the buffer is included on an adapter card in the video source device 102, such as a personal computer that begins to fill when writing to the buffer. The buffer continues to fill with the video source data, sends the video data to the network and begins filling again. Thus, the buffer fills in a continuous circular process.

The network 104 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure.

The playback destination device 106 can be a computer. The playback destination device receives the video data from the network 104 and places the video into a playback buffer (not shown). In an example, the playback buffer starts filling with video data in memory and continues to fill until the buffer reaches a certain point of fullness, at which time the playback buffer plays the video out on the display device 108.

Figure 2:
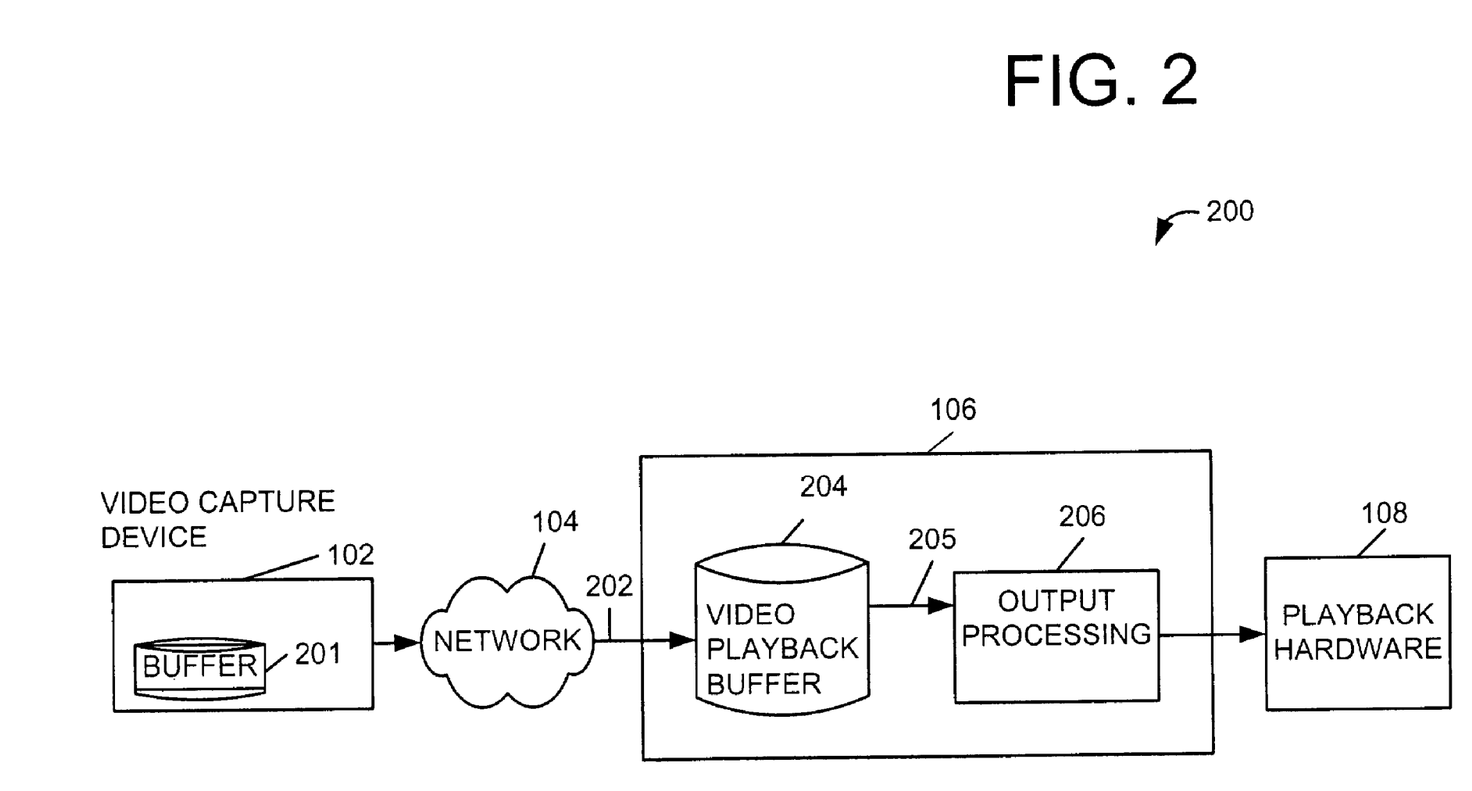
FIG. 2 is a block diagram depicting an embodiment of a system in which a video stream adaptive frame rate system may be implemented.

FIG. 2 is a block diagram depicting an embodiment of a system 200 in which a video stream adaptive frame rate system may be implemented. The system 200 includes video capture device 102, with a processing device for providing packetized samples, a network 104, a video playback device 106 and display device 108. Output from a video source that provides video frames per second is captured in a buffer 201 of the video capture device 102. A video source may be provided by a video camera, a VCR, a DVD player, among others. The packetized samples 202 are sent over the network 104 to the video playback device 106. Compression and encoding may also be used before transmission in some embodiments.

In a preferred embodiment, the video playback device 106 is a computer that includes, inter alia, a video playback buffer 204 and output processing 206. Preferably, the video playback buffer 204 is included in memory in the video playback device 106. Of course, other system memory may also be used for the video playback buffer 204. Packetized samples 202 from the network 104 are received at the video playback buffer 204. In an example, output processing 206 provides for adjusting the play rate of the samples 205 from the video playback buffer 204 to the playback hardware 108.

In operation, the video playback buffer 204 is configured such that a buffer fill level can be established, and the buffer fill level can be adjusted to ensure the buffer 204 is not too full or too low. If the buffer 204 becomes too full, i.e., the amount of video data is above a threshold, more samples are released out of the buffer 204 at a faster rate. If the buffer 204 becomes too low, samples are released from the buffer 204 at a slower rate. In addition, the adjustments of the buffer 204 (i.e., release rate changes) are determined by how far the buffer fill level is off a preferred fill level range. The video capture buffer 201 threshold levels are not adjusted, but the video playback buffer fill level range is effectively adjusted. The video playback buffer 204 and output processing device 206 provide for video playback through the display device that has substantially undetectable changes in video display to a viewer.

Figure 3:
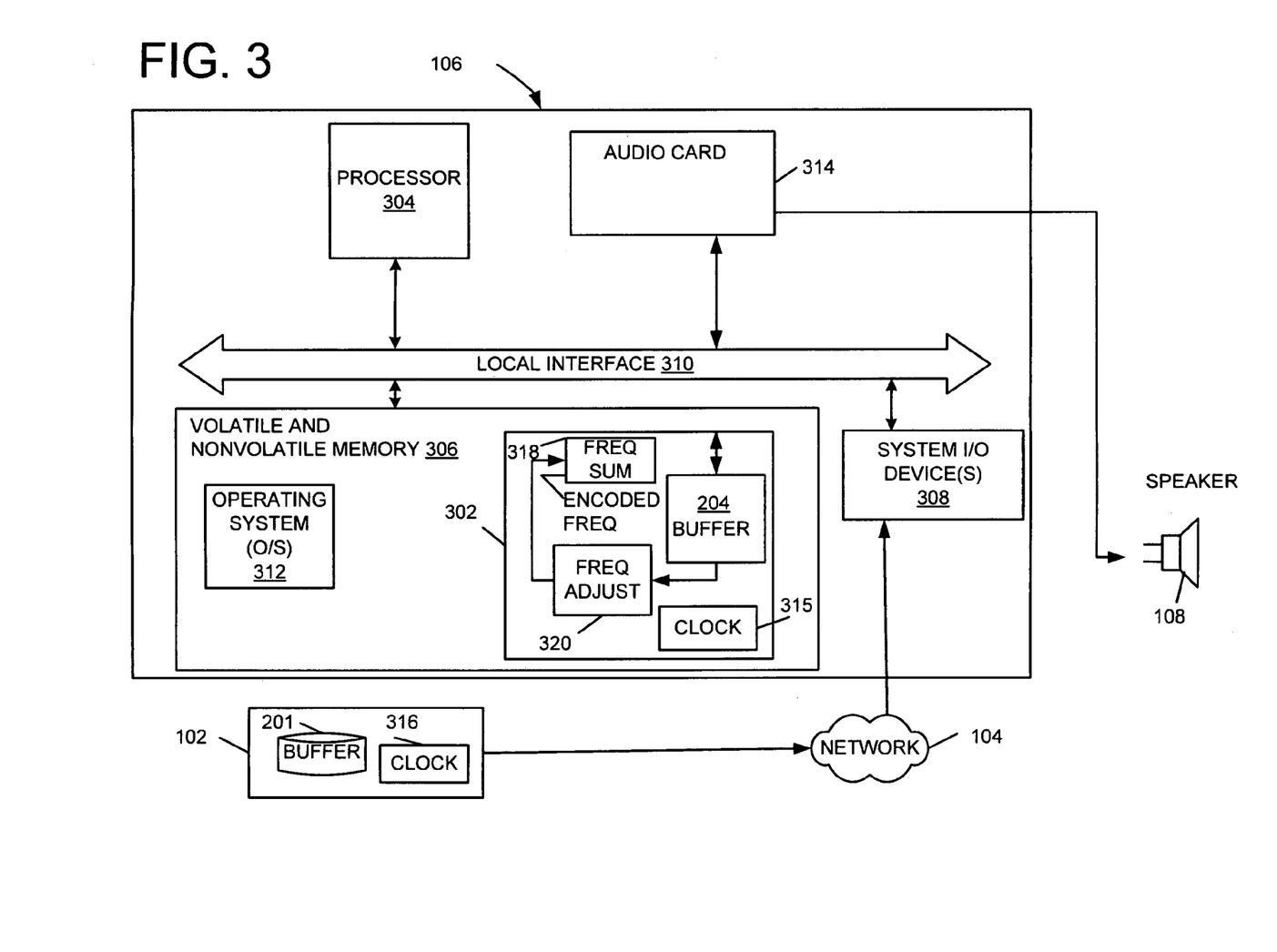
FIG. 3 is a block diagram depicting one example of a computing device in more detail that can be used to implement one preferred embodiment of a video stream adaptive frame rate system.

FIG. 3 is a block diagram depicting one example of a computing device 106 in more detail that can be used to implement one preferred embodiment of a video stream adaptive frame rate system. In a preferred embodiment, the computing device 106 comprises a video playback device. The video playback device 106 includes adaptive frame rate algorithm logic 302 that can be implemented in software (e.g., programming stored on a medium, firmware, etc.), hardware, or a combination thereof. In the preferred embodiments, the adaptive frame rate algorithm logic 302 is implemented in software as an executable program, and is executed by a special or general purpose digital computer, such as a personal computer (PC; IBM-compatible, Apple-compatible, or otherwise), workstation, minicomputer, or mainframe computer.

Generally, in terms of hardware architecture, the video playback device 106 includes, inter alia, a processor 304 and memory 306. Input and/or output (I/O) devices 308 (or peripherals) can be communicatively coupled to a local interface 310. The local interface 310 can be, for example but not limited to, one or more buses or other wired or wireless connections, as is known in the art. The local interface 310 may have additional elements, which are omitted for simplicity, such as controllers, buffers (caches), drivers, repeaters, and receivers, to enable communications. Further, the local interface 310 may include address, control, and/or data connections to enable appropriate communications among the aforementioned components.

The processor 304 is preferably a hardware device for executing software, particularly that stored in memory 306. The processor device 304 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 306 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 306 may incorporate electronic, magnetic, optical, and/or other types of storage media. Note that the memory 306 can have a distributed architecture, where various components are situated remote from one another, but can be accessed by the processor 304.

The software and/or firmware in memory 306 may include one or more separate programs, each of which comprises an ordered listing of executable instructions for implementing logical functions. In the example of FIG. 3, the software in the memory 306 includes the adaptive frame rate algorithm logic 302 and a suitable operating system (O/S) 312. The operating system 312 essentially controls the execution of other computer programs, such as logic 302 and a video card 314, and provides scheduling, input-output control, file and data management, memory management, and communication control and related services. In a preferred embodiment, the logic 302 includes the video playback buffer 204, a frame rate summation device (herein after referred to as a frame rate summer) 318, a frame rate adjust device (herein after referred to as a frame rate adjuster) 320, and a clock 315. In a preferred embodiment, the video playback buffer 204, frame rate summer 318, and frame rate adjuster 320 encompass a frame rate adjust algorithm. Preferably, the output from the buffer 204 goes to the video card 314.

In an example, the logic 302 is configured to drive the reading rate of the buffer 204 to release samples faster or slower such that a target fill level range is maintained. The video playback buffer 204 is sized based on target sample rates and delay. For example, the video playback buffer 204 can be configured to allocate 100 samples. Thus, if a target range is about 50 samples, when the video playback buffer 204 has received and stored 50 samples from the network 104, an video card 314 begins to read samples beginning at a designated address in the video playback buffer 204. In a perfect environment, samples in the buffer, beginning at the 51$^{st}$ sample, continue to be placed in the video playback buffer 204 as they are received from the network 104. The video card 314 continues to read samples at the desired frame rate and the samples are played at the speaker 108 or alternatively at a playback device in the video card 314.

In a typical environment, the network 104 may begin to send samples to the video playback buffer 204 that are above or below the target sample range or goal level. In this situation, the logic 302 adjusts the playback frame rate with a goal of maintaining a target level fill range of samples in the buffer 204. In an example, a play frame rate such as 5 frames per second is established for the playback destination device 106 for an 'n' sample playback buffer 204 target range. When the playback buffer 204 is within the preferred target buffer range, the playback frame rate is not adjusted by the frame rate adjuster 320. If the playback buffer 204 is not within the target buffer range, the playback frame rate is adjusted by the frame rate adjuster 320. The frame rate adjuster 320 is preferably configured to determine an offset frame rate. The offset frame rate is used to increase or decrease the rate of samples read from the playback buffer 204 to return the playback buffer 204 to preferred target range. The offset frame rate is sent to the frame rate summer 318 and added to the encoded frame rate to become the play frame rate for reading samples from the playback buffer 204. Preferably, the encoded frame rate for the frame rate summer 318 typically comes from the transmitted data being received from the network 104.

The playback frame rate is adjusted based on the target fill level range of playback buffer 204. As the fill level of the playback buffer 204 increases, the playback frame rate is increased to release more samples from the playback buffer 204 to bring the playback buffer 204 down to the target range. When the playback buffer level decreased, the playback frame rate is decreased to bring the playback buffer up to target range. The logic 302 attempts to keep 'n' number of milliseconds video samples in the video playback buffer by varying the playback frame rate. The logic 302 ultimately locks on to the source capture frame rate. The maximum playback frame rate deviation can be limited to prevent perceptible distortion in the video display.

The adaptive frame rate algorithm logic 302 is preferably a source program, executable program (object code), script, or any other entity comprising a set of instructions to be performed. When logic 302 is implemented as a source program, then the program needs to be translated via a compiler, assembler, interpreter, or the like, which may or may not be included within the memory 306, so as to operate properly in connection with the O/S 312. Furthermore, logic 302 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 308 may preferably include input devices, for example but not limited to, a keyboard, mouse, scanner, microphone, etc. Furthermore, the I/O devices 308 may also include output devices, for example but not limited to, a printer, display, etc. Finally, the I/O devices 308 may further include devices that communicate both inputs and outputs to the network 104 and display device 108, for instance but not limited to, a modulator/demodulator (modem; for accessing another device, system, or network), a radio frequency (RF) or other transceiver, a telephonic interface, a bridge, a router, etc.

When the logic 302 is implemented in software, it should be noted that the logic 302 could preferably be stored on any computer-readable medium for use by or in connection with any computer-related system or method. The logic 302 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or storage medium. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical). If implemented in hardware, as in an alternative embodiment, the logic 302 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In operation, a video capture sample clock 316 of the video capture device 102 and video playback sample clock 315 of the video playback device 106 are effectively synchronized to provide continuous uninterrupted video. The video playback buffer 204 level is monitored and used to dynamically adjust the video playback frame rate. The playback frame rate is constantly adjusted utilizing logic 302 to maintain the preferred number of samples in the video playback buffer 204, and thus lock on the frame rate of the remote video capture source 102. In addition to stabilizing a video stream by matching it to a particular source capture frame rate, minor delays in the network can be compensated. Thus, video interruptions are minimized or prevented. The enhanced stability allows for smaller video capture buffers 201 so transmission buffering delays are minimized.

Figure 4A:
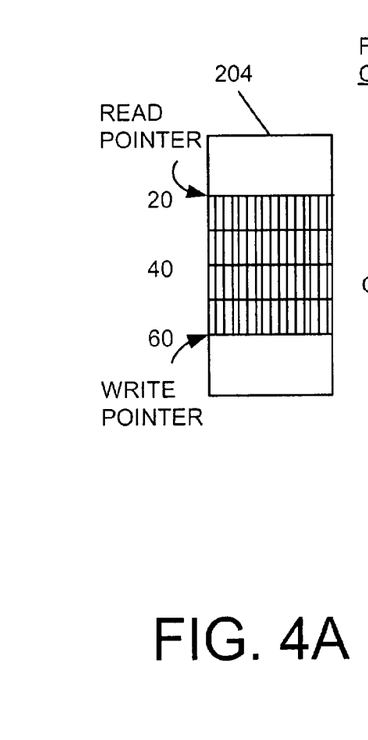
FIG. 4A is an illustrative example of a buffer of a video stream adaptive frame rate system.

FIG. 4A is an illustrative example of a buffer 204 of a video stream adaptive frame rate system. In a preferred embodiment, the buffer 204 is configured as a contiguous area of memory. In an example, a read pointer of the video card 314 begins reading video samples from the buffer 204 at memory address location 20. Once video samples have been read from a location in memory of the buffer 204, that space becomes an available space to be written into. In an example, the video card 314 continues to read video samples up to location 60. Once video samples are read from the buffer 204, the samples can be played by the video card 314 or alternatively by playback device 108. The write pointer at location 60 is set by logic 302. The write pointer preferably represents the next location to be filled with video samples. In an example with a rolling buffer of continuously addressed memory, the last read location is subtracted from the last write location (adjusting for when roll-over occurs with the last write location) to determine how high or low the buffer 204 level is, and that level is compared to the target fill level range to determine the amount of frame rate offset needed. The play frame rate, i.e., how fast the video card 314 is reading through the buffer 204 is adjusted by logic 302 to maintain video samples in the buffer 204 within target fill level range.

Figure 4B:
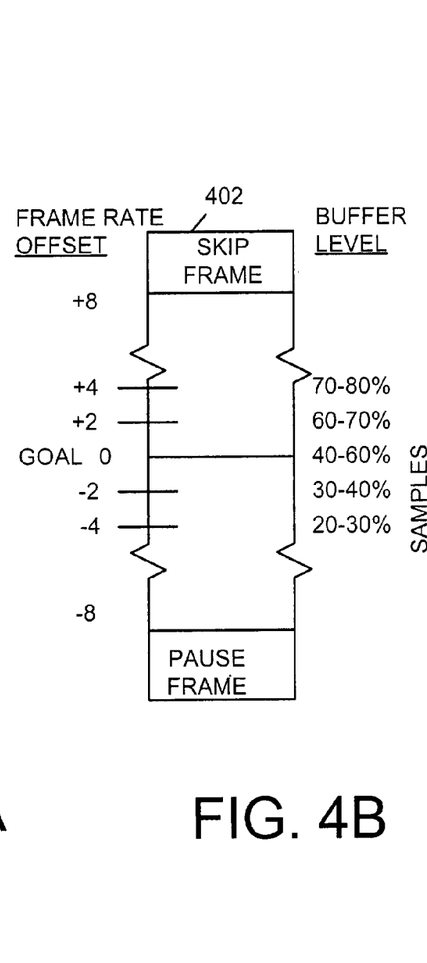
FIG. 4B is an illustrative example of a graphical illustration of a target fill ranges of a buffer of a video stream adaptive frame rate system.

FIG. 4B is an illustrative example of a graphical illustration 402 of a target fill level of the buffer 204 of a video stream adaptive frame rate system. In an example, when the buffer 204 has received between 40-60% of samples from the network 108, the buffer 204 is considered at a target goal level. As long as the number of samples in the buffer 204 are at goal, the frame rate of samples leaving the buffer 204 will not be adjusted, i.e., frame rate offset is zero. As the buffer 204 levels deviate from the target range, the frame rate is adjusted such that the buffer level returns to the target range. As long as the buffer fill is within a specified percentage of the target range, the frame rate is not adjusted. For example, if at around 5 frames per second, the samples in the buffer 204 are 40-60%, which is acceptable and the buffer fill level is not adjusted. In a preferred embodiment, the frame rate is adjusted in a graduated manner. In an example, at buffer levels of 60-70%, the frame rate offset is about +2% to increase the rate of samples taken out of the buffer 204 to bring the buffer level down to target range. In an example, buffer levels of 30-40%, the frame rate offset is about −2% to decrease the rate of samples taken out of the buffer 204 to bring the buffer level up to target range.

The frame rate offset can be increased or decreased in increments. The frame rate can be adjusted as desired however, adjustments should be made such that a user does not notice a perceptible degradation in video display. In an example, when the frame rate deviates about −8%, the buffer level is close to zero, and thus video is paused or lost. In an example, when the frame rate deviates about +8% range the buffer level is close to 100% and thus video play is skipped.

Figure 4C:
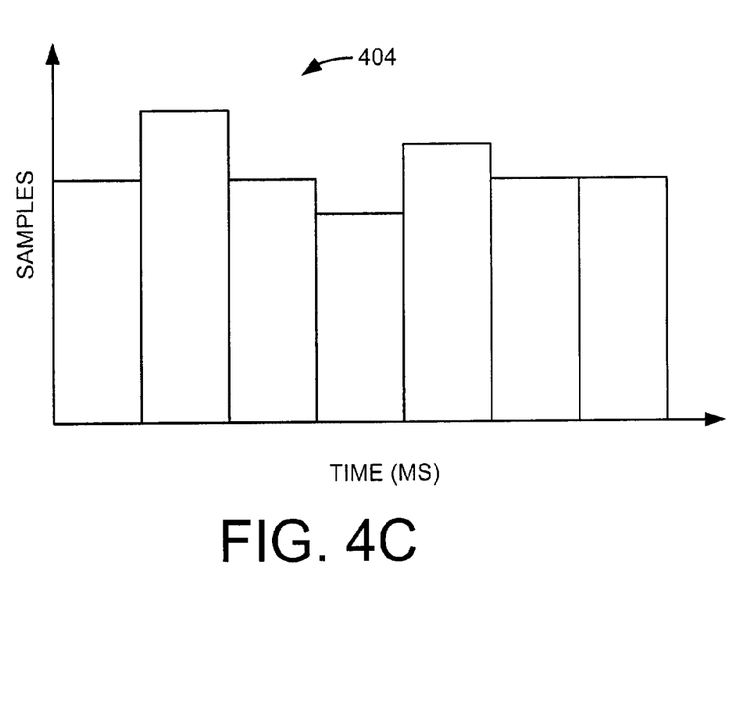
FIG. 4C is a graphic representation of adjusting the buffer fill levels of the buffer of FIG. 4B.

FIG. 4C is a graphic representation 404 of adjusting the buffer fill levels of the buffer of FIG. 4B. The graph 404 represents the changes in number of samples in the buffer over time that correspond to the adjustments made to the rate of playback of samples out of the playback buffer 204. The time is represented in milliseconds. In an example, a frame rate offset is zero for a buffer level of 40-60%. Over time as samples are received in the buffer 204 from the network 104, the buffer levels rise and fall. This is due in part to the rate that the samples are sent over the network 104 from the video capture buffer 201. In an example, the system 200 does not attempt to adjust the rate of sending of the video from the video capture buffer 201 but instead, adjusts the rate of playback from the playback buffer 204 such that a user does not notice a change in video quality.

Figure 5:
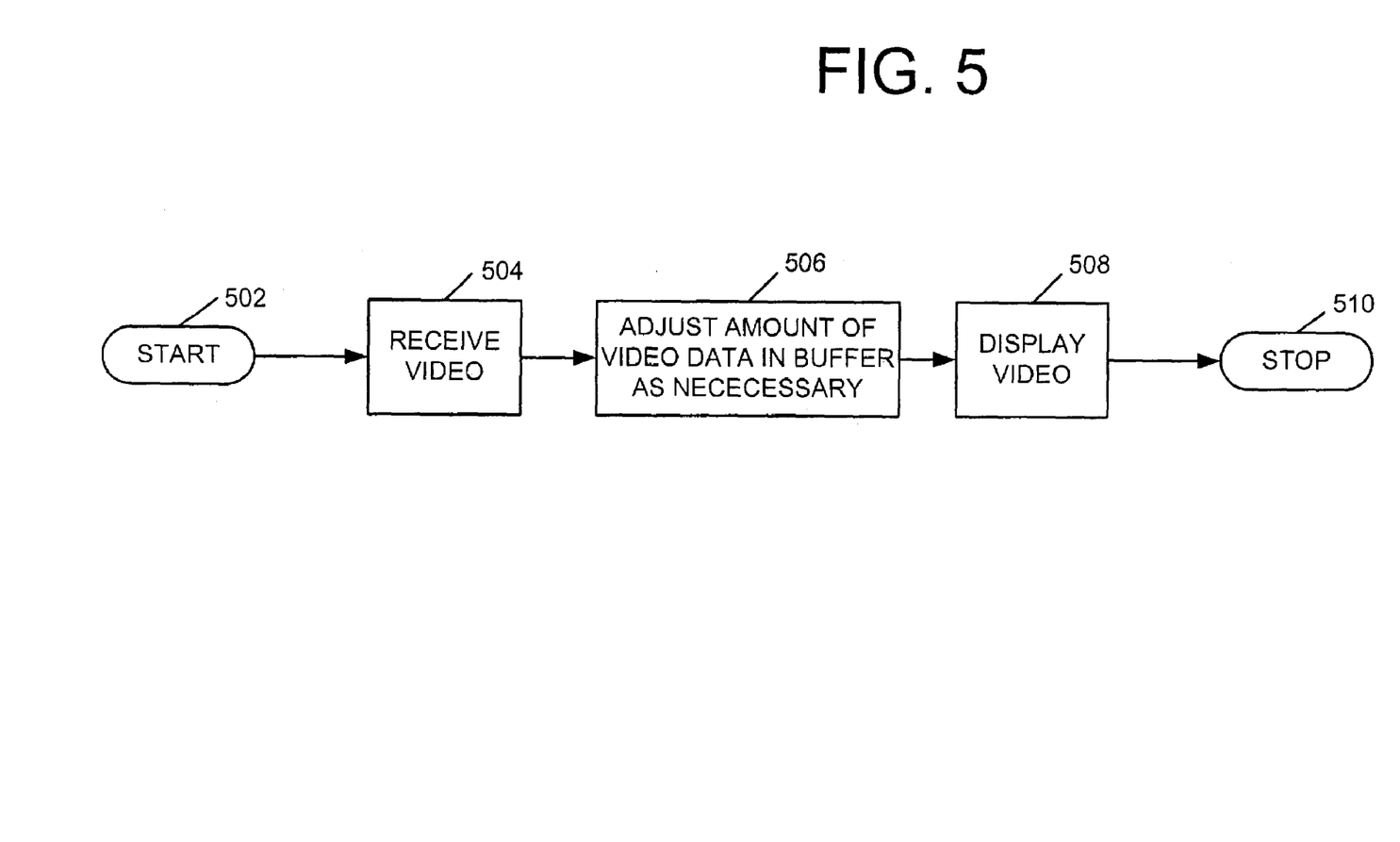
FIG. 5 is a flow chart depicting general functionality, in accordance with one preferred embodiment, of an implementation of a video stream adaptive frame rate system.

FIG. 5 is a flow chart depicting general functionality (or method), in accordance with one preferred embodiment, of an implementation of a video stream adaptive frame rate system. The process begins at 502. At 504, a video source is received. Preferably the video source is converted to video data and sent to a playback destination device. At 506, an amount of video data in a buffer of the playback destination device is adjusted as necessary. In an example, adjustments to the amount of video data in the buffer are necessitated because the amount of video data in the buffer deviates from a target buffer level range. In a preferred embodiment, the adjustment include releasing the samples at a faster rate when the buffer is greater than the target fill level and releasing the samples at a slower rate when the buffer is less than the target buffer level range. At 508, the released video samples are played by display device, such as a display device, among others. The process ends at 510.

Figure 6A:
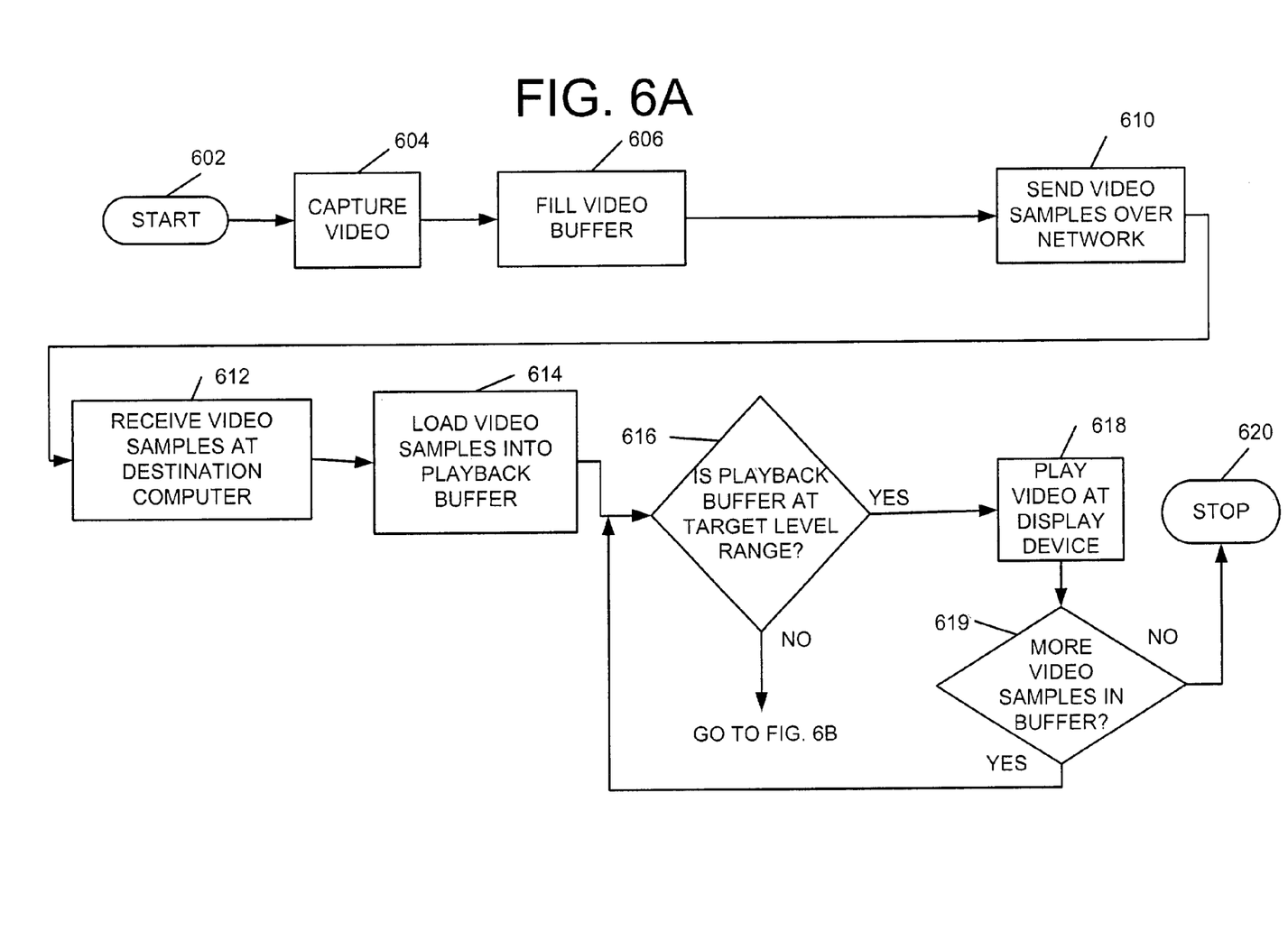
FIGS. 6A and 6B are flow charts depicting more specific functionality, in accordance with one preferred embodiment, of an implementation of a video stream adaptive frame rate system.
Figure 6B:
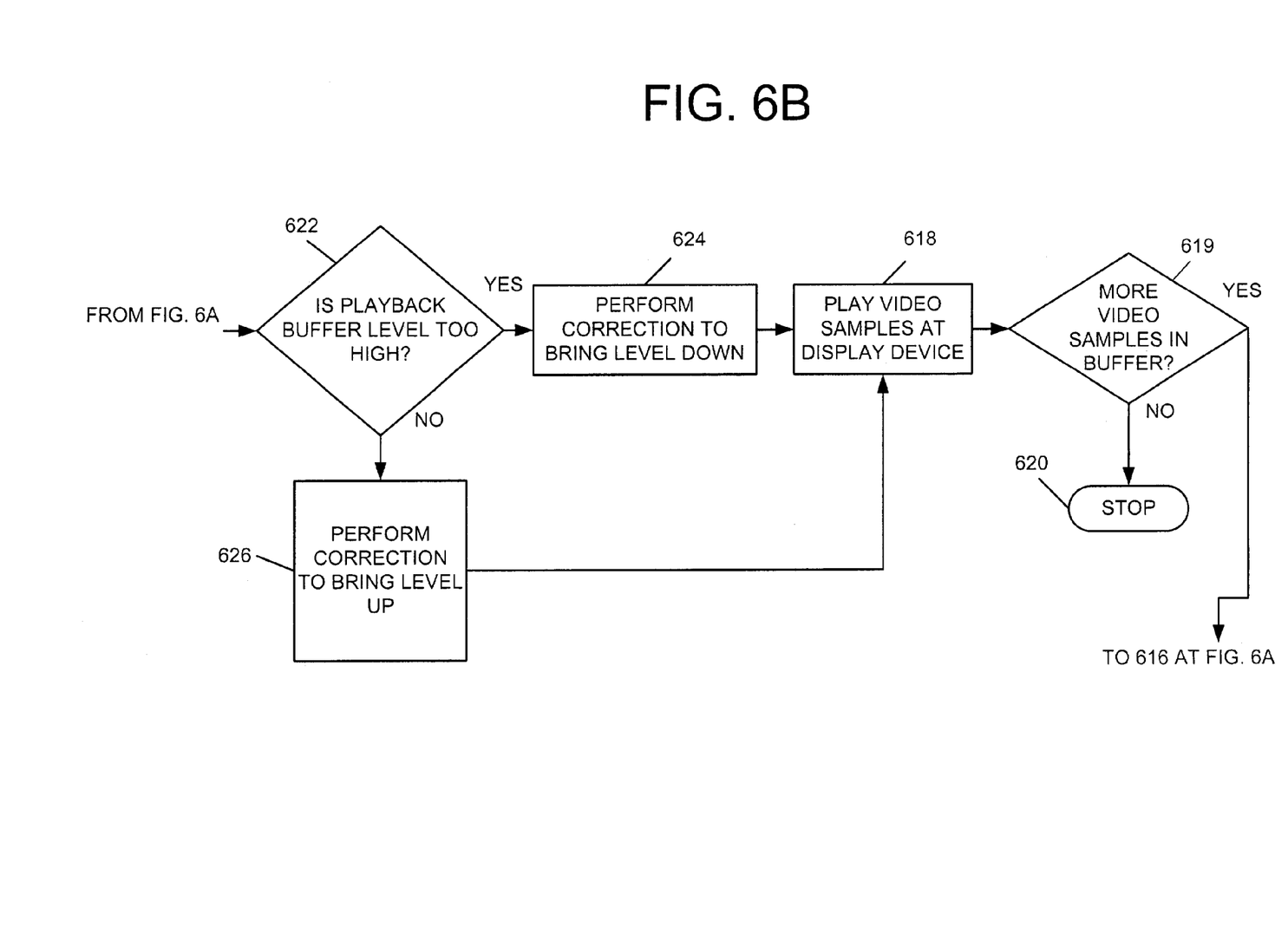

FIGS. 6A and 6B are flow charts depicting more specific functionality (or methods) in accordance with one preferred embodiment, of an implementation of a video stream adaptive frame rate system. Referring to FIG. 6A, the process begins at 602. At 604, a video source is captured. In an example, the video source is at a designated frame rate, such as 5 frames per second, and is captured by a video source computer. At 606, the captured video fills a buffer. In a preferred embodiment, the captured video fills a buffer at the video source device. At 610, the packetized sample is sent over a network. The packetized samples are received at a destination device at 612. In a preferred embodiment, the destination device is a video playback device.

At 614, the samples are loaded into a playback buffer. In a preferred embodiment, the playback buffer resides at the video playback device. At 616, a determination is made as to whether the playback buffer is at a target fill level range. If yes, at 618, the video samples are played at display device, such as a display device. At 619, a determination is made as to whether there are more video samples remaining in the buffer. If no, the process ends at 620. If yes, the process continues at 616.

Referring to FIG. 6B, at 622, a determination is made as to whether the playback buffer level range is too high. If yes, at 624, a correction is performed to bring down the target buffer level range. In an example, a correction encompasses playing the video at a faster rate such that over time, more samples are released from the buffer and the buffer level is reduced. Once the buffer level is at or near the target level range, the video samples are played at 618. At 619, a determination is made as to whether there are more video samples remaining in the buffer. If no, the process ends at 620. If yes, the process continues at 616 of FIG. 6A.

If the playback buffer level range is not too high, i.e., the level is too low, at 626, a correction is performed to bring the buffer level up. In an example, a correction encompasses playing the video at a slower rate such that over time, fewer samples are released from the buffer and the buffer level is increased. Once the buffer level is at or near the target level range, the video samples are displayed at 618. At 619, a determination is made as to whether there are more video samples remaining in the buffer. If no, the process ends at 620. If yes, the process continues at 616 of FIG. 6A.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The present invention provides for a playback device that can play video without encoded clocking information. The invention also provides for a playback frame rate that is constantly synchronized with a source frame rate. In addition, the invention provides for playback delays that can be short and consistent without video breakup.

This invention provides for an adaptive algorithm to vary the playback frame rate and maintain a particular buffer level to lock on a remote video capture frame rate. With this invention, no frame rate encoding information need be sent.

It should be emphasized that the above-described embodiments of the present invention, particularly, any "preferred" embodiments, are merely possible examples of implementations, merely set forth for a clear understanding of the principles of the invention. Many variations and modifications Therefore, having thus described the invention, at least following is claimed:

1. A method for adaptively adjusting a playback frame rate at which frames of a video stream are displayed on a playback device, the method comprising:
   receiving frames of the video stream at an incoming frame rate;
   loading the frames into a playback buffer at the incoming frame rate;
   reading frames from the playback buffer at the playback frame rate;
   computing a fill level parameter associated with the playback buffer, based on the incoming frame rate as compared to the playback frame rate, wherein the fill level parameter represents how much of the playback buffer is filled with the frames;
   comparing the fill level parameter to a designated level range for the playback buffer;
   determining an offset frame rate by which to adapt the playback frame rate so as to achieve the designated level range for the playback buffer, wherein determining an offset frame rate comprises:
      determining a current playback buffer level associated with the video source by determining a difference between a first location associated with the playback buffer from which the video stream was last read and a second location associated with the playback buffer from which the video stream was last written; and
      comparing the current playback buffer level with the designated level range to determine the offset frame rate;
   adapting the playback frame rate by combining the determined offset frame rate with the incoming frame rate so as to increase or decrease the playback frame rate to adjust the fill level parameter into the designated level range, the playback frame rate being increased or decreased in a graduated manner to prevent perceptible degradation during the playback, wherein the video stream does not encode clocking information, wherein the video stream does not encode frame rate information, and wherein adapting the playback frame rate includes:
      reading a video sample associated with the video stream from the playback buffer at a faster rate when the fill level parameter is higher than the designated level range, and
      reading the video sample from the playback buffer at a slower rate when the fill level parameter is lower than the designated level range;
   playing the video stream at a display device;
   capturing the video stream at a video source device, including filling a video buffer with the video stream;
   packetizing the video stream into at least one corresponding video sample;
   sending the video sample over a network to the playback buffer;
   establishing the designated level range of 40-60% of capacity of the playback buffer;
   establishing the designated target range level such that video played from a display device associated with the playback buffer plays the video without degradation of the video displayed;
   determining whether more of the video source remains in the playback buffer, and continuing to read the video source from the playback buffer as long as more of the video source remains in the playback buffer; and
   maintaining at least 200 ms of the video source in the playback buffer at all times.

2. A system for adaptively adjusting a playback frame rate at which frames of a video stream are displayed on a playback device, the system comprising:
   a playback buffer operative to receive frames of the video stream at an incoming frame rate from a video source, to load the frames at the incoming frame rate, and to read out the frames at the playback frame rate;
   a frame rate adjust device operative to compute a fill level parameter associated with the playback buffer, based on the incoming frame rate as compared to the playback frame rate, wherein the fill level parameter represents how much of the playback buffer is filled with the frames, to compare the fill level parameter to a designated level range for the playback buffer, and to determine an offset frame rate by which to adapt the playback frame rate so as to achieve the designated level range for the playback buffer;
   a frame rate summation device operative to adapt the playback frame rate by combining the determined offset frame rate with the incoming frame rate so as to increase or decrease the playback frame rate to adjust the fill level parameter into the designated level range;
   a frame rate limiting device to increase or decrease the playback frame rate in a graduated manner to prevent perceptible distortion during the playback, wherein the video stream does not encode clocking information, wherein the video stream does not encode frame rate information, and wherein adapting the playback frame rate includes:
      reading a video sample associated with the video stream from the playback buffer at a faster rate when the fill level parameter is higher than the designated level range, and
      reading the video sample from the playback buffer at a slower rate when the fill level parameter is lower than the designated level range; and
   a display device for viewing the video samples;
   a video capture device operative to capture the video stream and to convert the video stream into the video samples; and
   a communications network for sending and receiving the video samples between the video capture device and the playback buffer.

3. At least one computer-readable storage medium having a computer program for providing for adaptively adjusting a playback frame rate at which frames of a video stream are displayed on a playback device, the computer program comprising:
   logic configured to receive frames of the video stream at an incoming frame rate, to load the frames into a playback buffer at the incoming frame rate, and to read frames from the playback buffer at the playback frame rate;
   logic configured to compute a fill level parameter associated with the playback buffer, based on the incoming frame rate as compared to the playback frame rate, wherein the fill level parameter represents how much of the playback buffer is filled with the frames, to compare the fill level parameter to a designated level range for the playback buffer, and to determine an offset frame rate by which to adapt the playback frame rate so as to achieve the designated level range for the playback buffer;

logic configured to adapt the playback frame rate by combining the determined offset frame rate to with the incoming frame rate so as to increase or decrease the playback frame rate to adjust the fill level parameter into the designated level range, the playback frame rate being increased or decreased in a graduated manner to prevent perceptible degradation during the playback, wherein the video stream does not encode clocking information, wherein the video stream does not encode frame rate information, and wherein adapting the playback frame rate includes:

reading a video sample associated with the video stream from the playback buffer at a faster rate when the fill level parameter is higher than the designated level range, and reading the video sample from the playback buffer at a slower rate when the fill level parameter is lower than the designated level range;

logic configured to play the video stream at a display device;

logic configured to establish the designated level range at 40-60% of capacity of the playback buffer;

logic configured to determine whether more of the video stream remains in the playback buffer; and logic configured to continue to release the video stream from the playback buffer as along as more of the video stream remains in the playback buffer.

* * * * *